United States Patent
Dias

(10) Patent No.: US 8,028,238 B2
(45) Date of Patent: Sep. 27, 2011

(54) MESSAGE DISPLAY SYSTEM

(75) Inventor: Eric W B Dias, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 11/835,518

(22) Filed: Aug. 8, 2007

(65) Prior Publication Data

US 2009/0042542 A1 Feb. 12, 2009

(51) Int. Cl.
*G06F 3/00* (2006.01)
(52) U.S. Cl. ......................................... 715/752; 715/864
(58) Field of Classification Search ................... 715/752, 715/864
See application file for complete search history.

(56) References Cited

U.S. PATENT DOCUMENTS

| | | | | |
|---|---|---|---|---|
| 7,370,277 | B1 * | 5/2008 | Canfield et al. | 715/752 |
| 7,640,507 | B2 * | 12/2009 | Bedingfield, Sr. | 715/752 |
| 2002/0126146 | A1 * | 9/2002 | Burns et al. | 345/752 |
| 2004/0075687 | A1 * | 4/2004 | Oshiro et al. | 345/752 |
| 2006/0005128 | A1 * | 1/2006 | Haug et al. | 715/530 |

OTHER PUBLICATIONS

Gmail Overview, Dec. 2005.
Gmail Mobile Review Guide, Dec. 2005.
Outlook: Gmail Basics, University of Kansas 2004.
The Next Major Email Domain: Gmail.com, Jun. 2004.
Customizing Solid Works for Greater Productivity, Apr. 1, 2007.

* cited by examiner

*Primary Examiner* — Dennis Bonshock
(74) *Attorney, Agent, or Firm* — David A. Mims, Jr.; Mark Vallone; Robert V. Wilder

(57) ABSTRACT

A method, medium and implementing processing system are provided in which electronic message content and other selected or predetermined components of an electronic message are automatically displayed whenever an abbreviated or condensed message identification on a listing of messages is highlighted by a user. In one exemplary embodiment, Whenever an item of a message listing is highlighted by a user of a wireless phone or other communication device, a first pop-up content window is created and overlaid upon the listing display. The content window enables the user to view only predetermined portions, for example the first several lines of text of the highlighted message without having to access and scroll through other detailed portions of the message.

17 Claims, 5 Drawing Sheets

403
| # | Sender | Subject |
|---|--------|---------|
| 6 | Helen | Meeting Canceled |
| 5 | Bill | Lunch? |
| 4 | Becky | Changed Itinerary |
| 3 | Becky | Itinerary |
| 2 | Mike | Retirement Din.... |
| 1 | Mike | Retirement Din.... |
| BACK | | SELECT |

503 → FROM: HELEN

505 → SUBJECT: MEETING C...

507
TO: Bill
    Becky
    Mike
    Joe
    Jack
    Arnold
CC: Mr. Davis
.......

| # | Sender | Subject |
|---|--------|---------|
| 6 | Helen | Meeting Canceled | —601
| 5 | Bill | Lunch? |
| 4 | | |
| 3 | FROM: HELEN | |
| 2 | SUBJ: MEETING CAN. | —605
| 1 | Staff Mtg set for 2 PM has been canceled and scheduled for tomorrow 10 AM. Please advise if you cannot attend. HG. | |

603 braces rows 1–4

FIG. 6

| # | Sender | Subject |
|---|--------|---------|
| 6 | Helen | Meeting Canceled | —701
| 5 | Bill | Lunch? |
| 4 | | |
| 3 | FROM: BILL | |
| 2 | SUBJ: LUNCH | —705
| 1 | Big plans for next quarter. Can we have lunch at 12:45 to discuss? BH. | |

703 braces rows 1–4

FIG. 7

MESSAGE DISPLAY SYSTEM

FIELD OF THE INVENTION

The present invention relates generally to information processing systems and more particularly to a methodology and implementation for processing electronic messages.

BACKGROUND OF THE INVENTION

Electronic message systems are available in many forms and protocols on various kinds of electronic devices. In most such systems, individuals are enabled to send and receive electronic messages on cell phones, hand-held personal computers and other wireless and hard-wired personal communication devices. In many communication systems, a user is able to send out an electronic message to many individuals and send copies to additional individuals as well. Most of the time these messages will be responded to by the person receiving the message. The responses are then assembled and list in a short form without much detail so that the initial sender may select which of the responses the sender may wish to have displayed in detail. This short form listing of incoming messages is necessary because of the limited amount of display space available on displays of personal communication devices. For example, an incoming message listing may only include a sender's name, the subject of the communication and the time and/or date of the communication. In order for a user to view a specific response or communication, the user must first highlight the specific message on the incoming communication listing using a navigation function on the communication device, and then actuate a "READ" button in order to have the entire message presented on the display of the communication device. Even then, in most cases, the entire message cannot be displayed because of the limited size of the display screen. Further, in messages where there are many addressees, the detailed display of the message includes a listing of all of the addressees before the content of the message is displayed. Thus, a user must again use the navigation function to navigate past the sometimes extensive listing of addressees before being able to view the content of the message itself. This is a very cumbersome and time consuming process and frustrating to most users of personal communication devices.

Thus there is a need for an improved methodology and implementing message processing system which enables a more streamlined protocol for accessing and viewing electronic messages on personal communication devices.

SUMMARY OF THE INVENTION

A method, medium and implementing processing system are provided in which electronic message content and other selected or predetermined components of an electronic message are automatically displayed whenever an abbreviated or condensed message identification on a listing of messages is highlighted by a user. In one exemplary embodiment, Whenever an item of a message listing is highlighted by a user of a wireless phone or other communication device, a first pop-up content window is created and overlaid upon the listing display. The content window enables the user to view only predetermined portions, for example the first several lines of text of the highlighted message without having to access and scroll through other detailed portions of the message. When the focus or highlight is moved to a second item on the list of messages, the content of the particular message being highlighted is displayed in a second content window created to show only the predetermined content, such as the message text portion or the first three lines of the message text portion, of the second message. The user is also enabled to access and display the detailed message after determining from the content window that the user wishes to view the entire message.

BRIEF DESCRIPTION OF THE DRAWINGS

A better understanding of the present invention can be obtained when the following detailed description of a preferred embodiment is considered in conjunction with the following drawings, in which:

FIG. 4 is an exemplary message listing;

FIG. 5 is an exemplary detailed message;

FIG. 6 is a display screen of a communication device in which the present invention is implemented;

FIG. 7 is another example of a display screen generated in accordance with the present invention.

DETAILED DESCRIPTION

The various methods discussed herein may be implemented within a communication system which includes processing means, memory, updateable storage, input means and display means. Since the individual components of a communication system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a wireless or cellular phone system, it is understood that the principles of the invention may be implemented in any of many available and future communication devices and systems.

Figure 1:
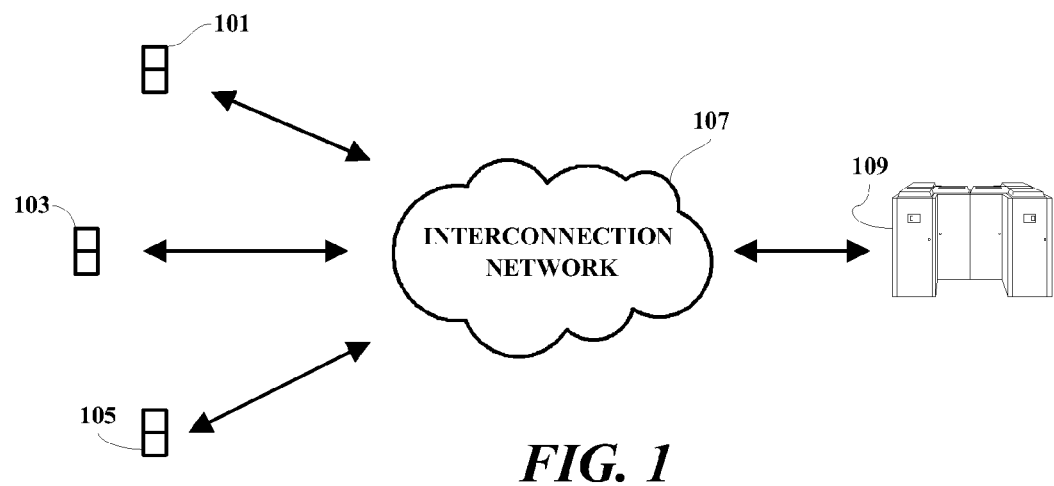
FIG. 1 is an illustration of one embodiment of a system in which the present invention may be implemented.

With specific reference to the exemplary embodiments illustrated in the drawings, FIG. 1 shows a communication system in which the present invention may be implemented in one of many possible exemplary embodiments. As shown, a plurality of individual communication devices 101, 103 and 105 are connected through an interconnection network 107 to a mail processing server 109. Individual users are enabled to send electronic messages such as emails to one another, and receive responses thereto through the mail server 109.

Figure 2:
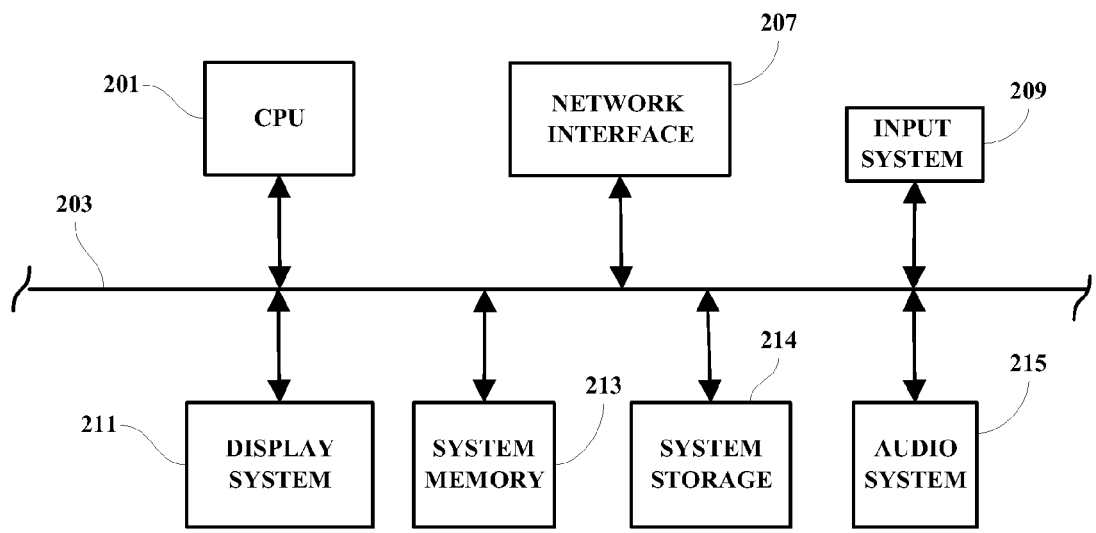
FIG. 2 is a block diagram showing several of the major components of a user communication device in accordance with the present invention.

In FIG. 2, several exemplary components of the wireless communication devices 101-105 are illustrated. As shown, a processing system including a CPU 201 is connected to a main bus 203. Other systems are also connected to the main bus 203 including, but not limited to, a network interface 207 for communicating with the server 109, an input system 209 for enabling user input to the system, a display system 211 for displaying, inter alia, electronic messages and listings information and other menus to the user, system memory 213 and system storage 214 from which programming may be accessed and executed, and an audio system 215 which may be used for input and output purposes. It is noted that the display system 211 may include a touch-sensitive display screen in which case the display screen may also function as an input device and a selection device for selecting options from a displayed menu.

Figure 3:
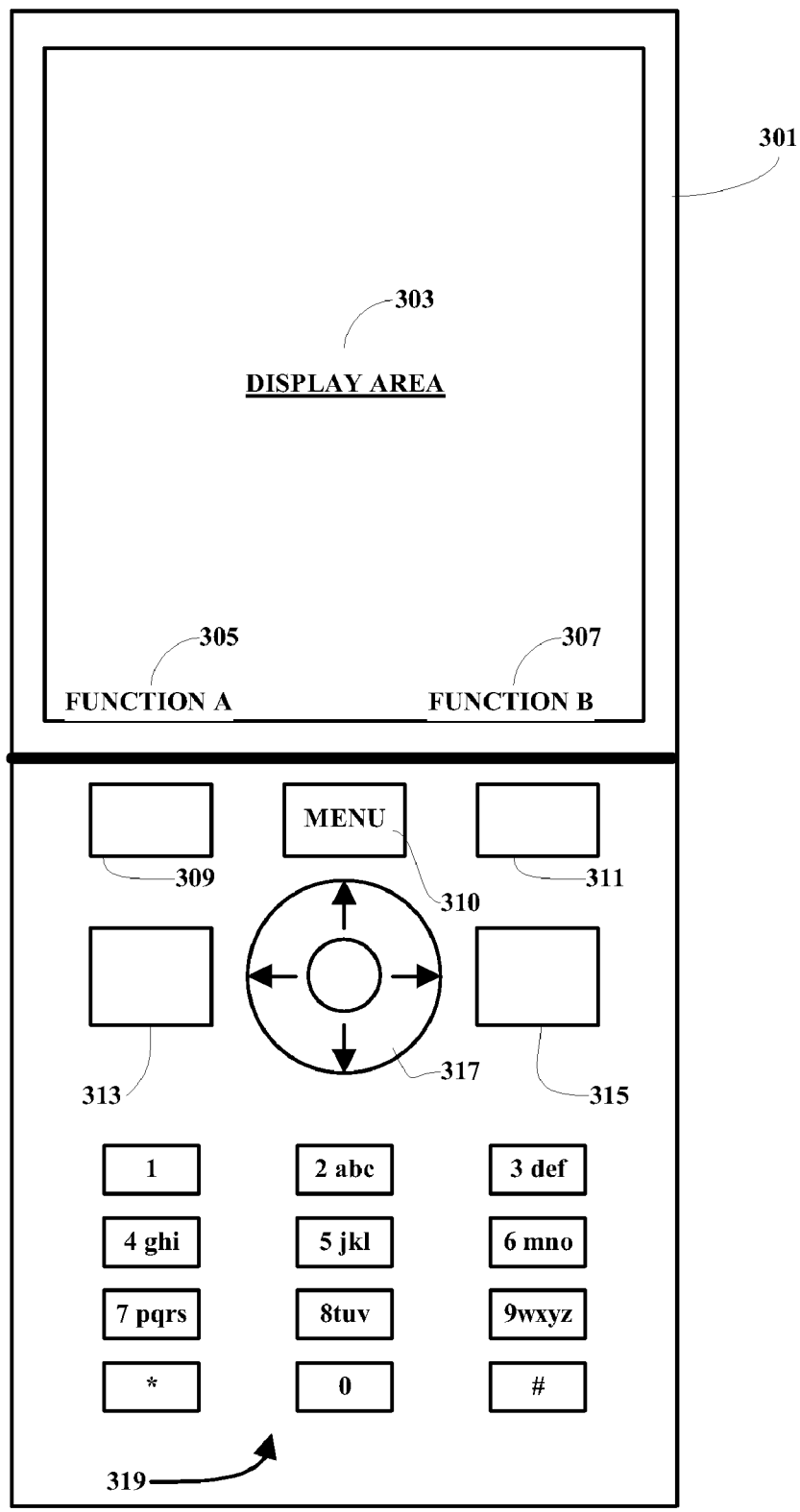
FIG. 3 is an exemplary communication device which may be used in implementing the present invention.

FIG. 3 illustrates an exemplary communication device 301 such as a cellular phone. It is noted that the display area 303 is rather small since the communication device 301 is designed to be a hand-held device. The display screen of the device 301 also shows designated function areas 305 and 307 which are controlled by running software to display options which may be selected by a user by actuating corresponding hardware switches 309 and 311, respectively. The device 301 also includes a menu selection button 310, a navigation device or functional instrument 317 as well as several other function selection buttons 313 and 315 and a keypad layout 319. Typically, the display area 303 presents a menu or listing to a user, the user is enabled to select an item from a listing or menu presented on the display screen 303 by depressing one or more arrows of the navigation device 317 until the selected item is highlighted or otherwise focused on the display 303. At that point the user may hit a "SELECT" button such as the target button in the middle of the navigation device 317 or one of the function buttons 309 or 311 to select the highlighted item on the displayed listing or menu. In an email or other electronic message application for example, a listing of abbreviated identifications of inbox messages is presented on the display screen 303 and the user is enabled to use the navigation tool 317 to highlight a selected message on the listing and then press an ENTER function to have the details of the selected message displayed.

As shown in FIG. 4, in one example, a displayed listing of messages is presented on a display screen 401 in abbreviated form which may show, for example, header information such as a message number 403 and a listing of individual messages 404. The header information in the listing may also show, for example, the date of the message and/or the subject of the message if display space is available. Also shown are the function switches 405 and 407 which enable the user to go "BACK" and display a previous screen or "SELECT" a highlighted message. In the drawing, the first message from Helen is shown as highlighted, i.e. displayed in distinguished form from the other items in the listing. The user is enabled to move the highlight aspect to any other of the listed messages by using the navigation device 317. With the screen as shown in FIG. 4, if the user hits the switch corresponding to the SELECT function, the entire message #6 from "Helen" would be displayed.

In FIG. 5, an example of the selected message from "Helen" is illustrated. As shown, the display 501 shows the message including header information such as a "From" field 503, a "Subject" field 505, and a display of a portion of the addressees and copied individuals 507. As illustrated, the display area is not large enough to display all of those copied on the correspondence or the content of the message itself. In the example, there is a slide bar 509 on the right side of the display which indicates that there is a substantial amount of the message remaining and not displayed. It is noted that the user in the illustrated example would have to scroll down in the message past those copied before getting to the content section or portion of the message and then scroll even further to get to a particular portion of the content in which the user is interested.

One exemplary implementation of the present invention is illustrated in FIG. 6. As shown, a display screen 601 shows a listing 603 of "Inbox" messages. When the first message to "Helen" is highlighted by the user, a pop-up "content" window 605 is automatically displayed overlying the displayed listing 603. The content window is designed to display the content of the message highlighted without requiring the user to navigate and scroll as hereinbefore discussed. The content window determines where the content of the message begins by finding an appropriate content field markers in the message display data. As illustrated, in the example, the first five lines of the message content are displayed in the pop-up content window along with the "From" and "Subject" fields. This enables the user to ascertain the message content quickly and navigate through the entire listing of messages in the same way to quickly find a selected message or a particular message for example which will have an answer to a posed question, without having to go through the details of all of the messages in the user's inbox listing. If the message cannot be completely displayed in the message box, then the user is provided by an option to scroll the message until the end of the message.

It is noted that a user preference input function may also be provided (not shown) by which a user may input into the communication device (using the keypad and select buttons relative to a displayed menu or touch-sensitive screen) the user's preferences with regard to the size, content or even size and/or shape and/or location of the pop-up content window. For example, the user may input to a preference screen (not shown) that the user wishes to have text in the pop-up content window displayed in #8 Arial or other font, regardless of the size of the font in the message itself. The user may also input to have the first six lines of the content displayed or to have only the first two lines of the content displayed in the pop-up window. In this manner, the user is enabled to determine the size of the pop-up window relative to the full screen size, and thereby control the amount of the listing viewable when the content pop-up window is also displayed. A further selection by the user enables the user to select the portion of the screen over which the pop-up window is displayed, i.e. top-right, bottom-left, etc. The user is also enabled to select which fields are to be displayed in the pop-up content window. For example, one user may wish to have only the Sender and Content portions displayed in the pop-up window while another user may choose to have the Sender, Subject and Content portions displayed in the pop-up window. The user may also input to the communication device to vary the size of the pop-up window to suit the user's needs. Further, the user may enable the pop-up window to be automatically downsized when the message content is short in order to have more of the listing viewable to the user, or to have the content truncated at predetermined points or after a selected number of lines when the message content is too long.

FIG. 7 shows another example of a pop-up content window 705 on a display screen 701 overlying a message inbox listing 702 when the highlighted message is Message #5 from "Bill". In another example of the present invention, the pop-up window is transparent or semi-transparent such that the listing of messages is viewable through the pop-up window. In yet another example, the pop-up window appears only for a predetermined time after a listed inbox message is highlighted after which the listing is again viewable without the overlaid pop-up window, thereby giving the user enough time to view the selected content without unnecessarily obstructing the display of all received messages in the listing.

Figure 8:
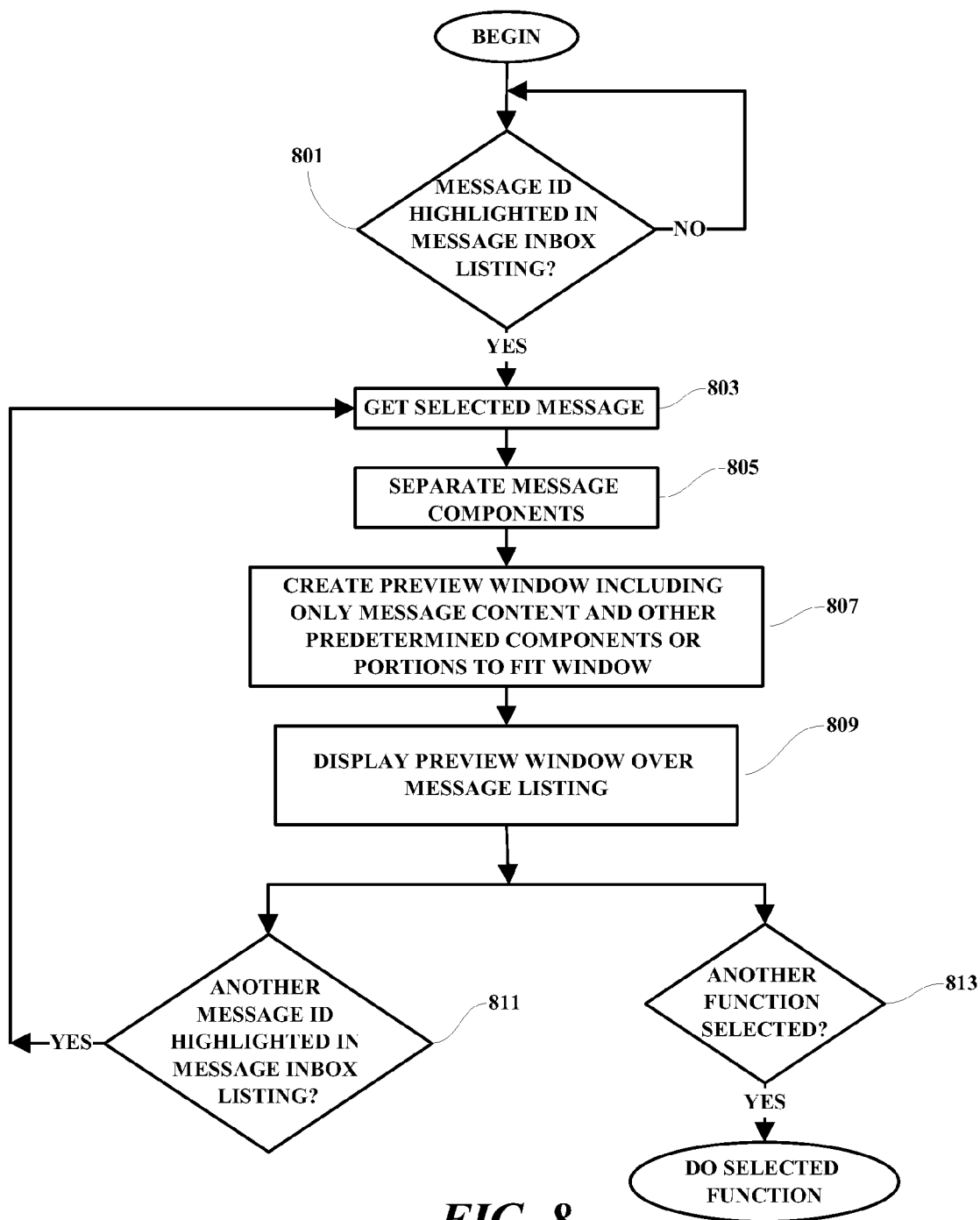
FIG. 8 is a flow chart illustrating an exemplary operation in one embodiment of the present invention.

FIG. 8 illustrates an exemplary flow in which, when a message is highlighted 801 in the message inbox listing, the selected message is fetched 803 and the message components are separated 805. Next, a preview or pop-up window is created 807 which contains only the predetermined components or portions of the selected message. The contents may be truncated or the pop-up window may then be re-sized to suit the amount of text in the portions or components of the message to be displayed in the pop-up window. The pop-up content window may be displayed while a particular message has been highlighted 809 until either another function of the communication device has been selected 813 or another one of the listed inbox messages has been highlighted 811. As hereinbefore discussed, in another embodiment (not illustrated), the pop-up content window is displayed only for a predetermined period of time (rather than continuously 809) after a selected inbox message has been highlighted by the user. The predetermined period of time preferred by the user may be set by an appropriate input to a user preferences screen (not shown).

The method and apparatus of the present invention has been described in connection with a preferred embodiment as disclosed herein. The disclosed methodology may be implemented in a wide range of sequences, menus and screen designs, to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any storage media, including portable or fixed, volatile or non-volatile memory; media device, including CDs, RAM and "Flash" memory, or other semiconductor, optical, magnetic or other memory storage media. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer-implemented method for processing messages for display to a user on a display device, said messages containing a header information section and a message content section, said computer-implemented method comprising:
   presenting said messages in an abbreviated form in a list on said display device, said abbreviated form including only said header information for each of said messages;
   enabling a highlighting of a selected one of said abbreviated form messages in said list on said display device by said user;
   determining that said user has highlighted said selected one of said abbreviated form messages; and
   automatically displaying content information from said message content section of said selected one of said abbreviated form messages in response to said determining and without further action by said user, said content information of said selected one of said abbreviated form messages being displayed only for a user selectable and pre-set constant period of time after said user has highlighted said selected one of said abbreviated form messages or until another one of said abbreviated form messages is highlighted.

2. The computer-implemented method as set forth in claim 1 wherein said displayed content information is displayed in a message content window overlying said list.

3. The computer-implemented method as set forth in claim 2 and further comprising:
   displaying a user preferences screen; and
   setting said user selectable and pre-set constant period of time in response to an input from said user.

4. The computer-implemented method as set forth in claim 2 and further comprising providing enabling means wherein said user is enabled to change characteristics of said message content window.

5. The computer-implemented method as set forth in claim 4 wherein said characteristics include size of said content window.

6. The computer-implemented method as set forth in claim 4 wherein said characteristics include a number of lines of text displayed in said content window, said computer-implemented method further comprising displaying a scroll device an said content window for scrolling to un-displayed lines when said number of displayed lines in said content window is less than a number of lines in said message content section of a selected message.

7. The computer-implemented method as set forth in claim 4 wherein said characteristics include a location of said content window on said display device.

8. The computer-implemented method as set forth in claim 1 and further comprising:
   displaying a user preferences screen; and
   setting said user selectable and pre-set constant period of time in response to an input from said user.

9. The computer-implemented method as set forth in claim 1 wherein only a predetermined portion of said content information within said message content section of said selected one of said abbreviated form messages is displayed.

10. A computer program product comprising one or more computer-readable tangible storage devices and computer-readable program instructions which are stored on the one or more storage devices and when executed by one or more processors perform the computer-implemented method of claim 1.

11. A computer system comprising one or more processors, one or more computer-readable memories, one or more computer-readable tangible storage devices, and program instructions which are stored on the one or more storage devices for execution by the one or more processors via the one or more memories and when executed by the one or more processors perform the computer-implemented method of claim 1.

12. A computer program product for processing messages for display to a user on a display device of a computer system, said messages containing a header information section and a message content section, said computer program product comprising:
   one or more a computer-readable, tangible storage devices; and
   program instructions, stored on at least one of the one or more storage devices, to present said messages in an abbreviated form in a list on said display device, said abbreviated form including only said header information for each of said messages;
   program instructions, stored on at least one of the one or more storage devices, to enable a highlighting of a selected one of said abbreviated form messages in said list on said display device by said user;
   program instructions, stored on at least one of the one or more storage devices, to determine when said user has highlighted said selected one of said abbreviated form messages;
   program instructions, stored on at least one of the one or more storage devices, to automatically display content information from said message content section of said selected one of said abbreviated form messages in a message content window for a user selectable and pre-set constant period of time in response to determining when said user has highlighted said selected one of said abbreviated form messages and without further action by said user; and program instructions, stored on at least one of the one or more storage devices, to display a scroll device in said content window for scrolling to un-displayed lines when a number of displayed lines in said content window is less than a number of lines in said message content section of a selected message.

13. The computer program product as set forth in claim 12 further comprising program instructions, stored on at least one of the one or more storage devices, to display content information in said message content window overlying said list.

14. The computer program product as set forth in claim 13 further comprising program instructions, stored on at least one of the one or more storage devices, to enable said user to change characteristics of said message content window.

15. The computer program product as set forth in claim 12 wherein said program instructions are further operable to cause a display of said content information in said message content window for said selectable and pre-set period of time or until another one of said abbreviated form messages is highlighted by said user, whichever shall first occur.

16. The computer program product as set forth in claim 12 wherein said program instructions to automatically display said content information from said message content section of said selected one of said abbreviated form messages display only a predetermined, portion of said content information from said message content section of said selected one of said abbreviated form messages.

17. A computer system for processing messages for display to a user on a display device, said messages containing a header information section and a message content section, said computer system comprising:

one or more processors, one or more computer-readable memories and one or more computer-readable tangible storage devices;

program instructions, stored on at least one of the one or more storage devices for execution by at least one of the one or more processors via at least one of the one or more memories, to present said messages in an abbreviated form in a list on a display device, said abbreviated form including only said header information for each of said messages displayed;

program instructions, stored on at least one of the one or more storage devices for execution by at least one of the one-or more processors via at least one of the one or more memories, to enable a highlighting of a selected one of said abbreviated form messages in said list on said display device by said user;

program instructions, stored on at least one of the one or more-storage devices for execution by at least one of the one or more processors via at least one of the one or more memories, to determine when said user has highlighted said selected one of said abbreviated form messages;

program instructions, stored on at least one of the one or more storage devices for execution by at least one of the one or more processors via at least one of the one or more memories, to automatically display content information from said message content section of said selected one of said abbreviated form messages in a message content window overlying said list in response to determining when said user has highlighted said selected one of said abbreviated form message and without further action by said user, said content information of said selected one of said abbreviated form messages being displayed in said message content window only for a user selectable and pre-set constant period of time after said user has highlighted said selected one of said abbreviated form messages in said list or until another one of said abbreviated form messages in said list is highlighted by said user; and program instructions, stored on at least one of the one or more storage devices for execution by at least one of the one or more processors via at least one of the one or more memories, to display a scroll device in said message content window for enabling said user to scroll to un-displayed lines when a number of displayed lines in said content window is less than a number of lines in said message content section of a selected message.

* * * * *